United States Patent
Dallaway

(10) Patent No.: US 7,284,161 B2
(45) Date of Patent: Oct. 16, 2007

(54) METHOD OF AND APPARATUS FOR TESTING A SERVER

(75) Inventor: Owen Simon Dallaway, Wellington (NZ)

(73) Assignee: Unisys Corporation, Blue Bell, PA (US)

( * ) Notice: Subject to any disclaimer, the term of this patent is extended or adjusted under 35 U.S.C. 154(b) by 621 days.

(21) Appl. No.: 10/498,645

(22) PCT Filed: Dec. 12, 2001

(86) PCT No.: PCT/NZ01/00278

§ 371 (c)(1),
(2), (4) Date: Jun. 14, 2004

(87) PCT Pub. No.: WO03/050681

PCT Pub. Date: Jun. 19, 2003

(65) Prior Publication Data

US 2005/0081081 A1    Apr. 14, 2005

(51) Int. Cl.
    *G06F 11/00* (2006.01)
(52) U.S. Cl. ...................................... 714/47
(58) Field of Classification Search .......... 714/47, 714/37, 38; 709/219, 203, 217; 717/115, 717/124
See application file for complete search history.

(56) References Cited

U.S. PATENT DOCUMENTS 5,506,832 A * 4/1996 Arshi et al. .................. 370/241
5,812,780 A    9/1998 Chen et al.
5,864,563 A    1/1999 Ratcliffe
5,881,237 A    3/1999 Schwaller et al.
5,974,572 A    10/1999 Weinberg et al.
6,044,398 A *  3/2000 Marullo et al. .............. 709/219
6,157,940 A    12/2000 Marullo et al.
6,249,886 B1 * 6/2001 Kalkunte ....................... 714/47
6,701,514 B1 * 3/2004 Haswell et al. ............. 717/115

FOREIGN PATENT DOCUMENTS

EP    0 871 306    10/1998

OTHER PUBLICATIONS

Australian Patent Office International-Type Search Report, Oct. 22, 2001.
International Search Report, Apr. 3, 2002.

* cited by examiner

*Primary Examiner*—Nadeem Iqbal
(74) *Attorney, Agent, or Firm*—Richard J. Gregson; Ellis Verboeket Terry

(57) ABSTRACT

A method for testing a server. A component (2) captures a session consisting of requests of and responses from a server (3). The captured session is stored as script files (4, 5). A GUI component (6) facilitates the identification of variable data (30) within the script files. Variable data is data which may vary from session to session. The identification process generates a database (14) with field headers (18) corresponding to the types of data identified (15). A component populates database (13). A driver component (9) uses the script files (11, 12) and the database (13) to test the server (3) by running multiple threads (10) each directing their own session with the server. Where data within the script files has been identified as variable data (13) the thread may substitute data from the database (13). A server testing apparatus and software for implementing the method is also disclosed.

31 Claims, 4 Drawing Sheets

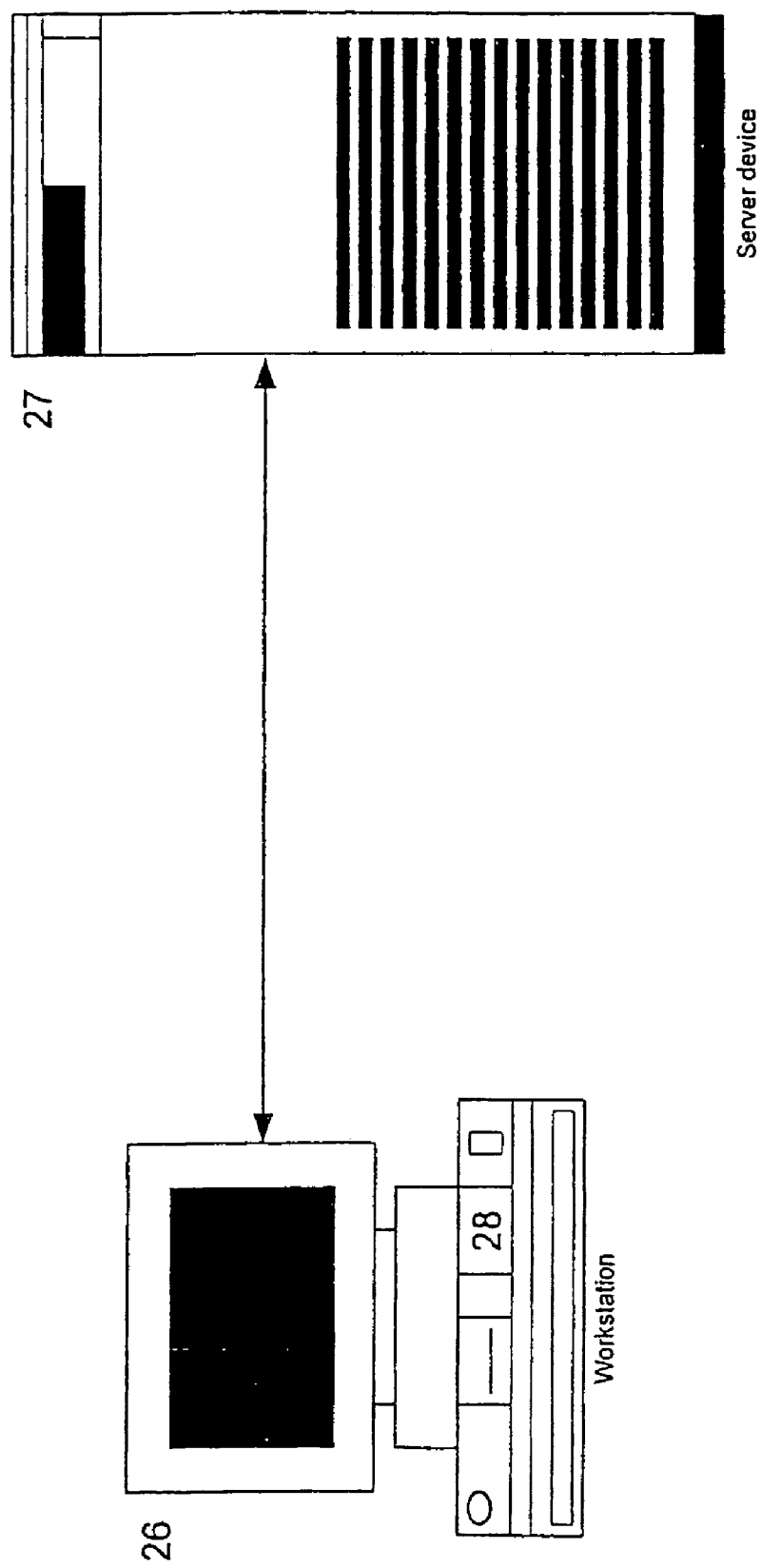

METHOD OF AND APPARATUS FOR TESTING A SERVER

FIELD OF INVENTION

The present invention relates to a method of testing a server. More particularly, but not exclusively, the present invention relates to a method of load testing a web server.

BACKGROUND TO THE INVENTION

Standard approaches to testing web servers involve creating scripts using a programming language and using a driver program to run these scripts to test a server. A disadvantage to this approach is that the individuals who are testing the web server must be competent in using a programming language.

Another approach involves the capture of traffic between a user and the server. This captured script can be then used to load test the web server by running multiple simultaneous instances using a driver program. Programs that implement this approach include LoadRunner and Astra SiteTest. This approach has a number of disadvantages. Firstly it can be difficult to thoroughly test a server as the script when used by multiple instances is unchanged, therefore only one type of user is tested. Secondly, a problem arises if the server to be tested requires unique data, for example unique simultaneous users. The only way for this approach to overcome the difficulty is by capturing multiple user sessions and having each instance use the script from a different session. This can be time-consuming for the user.

SUMMARY OF THE INVENTION

It is an object of the invention to provide a simple method of testing a web server which thoroughly tests the server without requiring users to have advanced programming ability, or to at least provide the public with a useful choice.

According to the invention there is provided a method of testing a server, the method including the steps of:
  capturing script files resulting from the interaction between a server and another device;
  utilising a Graphical User Interface (GUI) to identify variable data within the script files;
  forming a database of substitute values for the variable data; and
  testing the server by using one or more separate threads each selecting data from the database in substitution for the variable data.

There is further provided software for effecting the method.

There is still further provided a server testing apparatus, the apparatus including:
  means for capturing script files resulting from interaction between a server and another device;
  a Graphical User Interface (GUI) responsive to a user input device for identifying data within the script files;
  means for forming a database of substitute values for the variable data; and
  means for generating one or more separate threads to test a server based upon the captured script files in which data from the database is substituted for the variable data.

BRIEF DESCRIPTION OF THE DRAWINGS

A preferred embodiment of the invention will now be described, by way of example only, with reference to the accompanying drawings in which:
FIG. 4 illustrates how the method may be deployed on a single personal computer with a processor and memory.

DETAILED DESCRIPTION OF PREFERRED EMBODIMENTS

Figure 1:
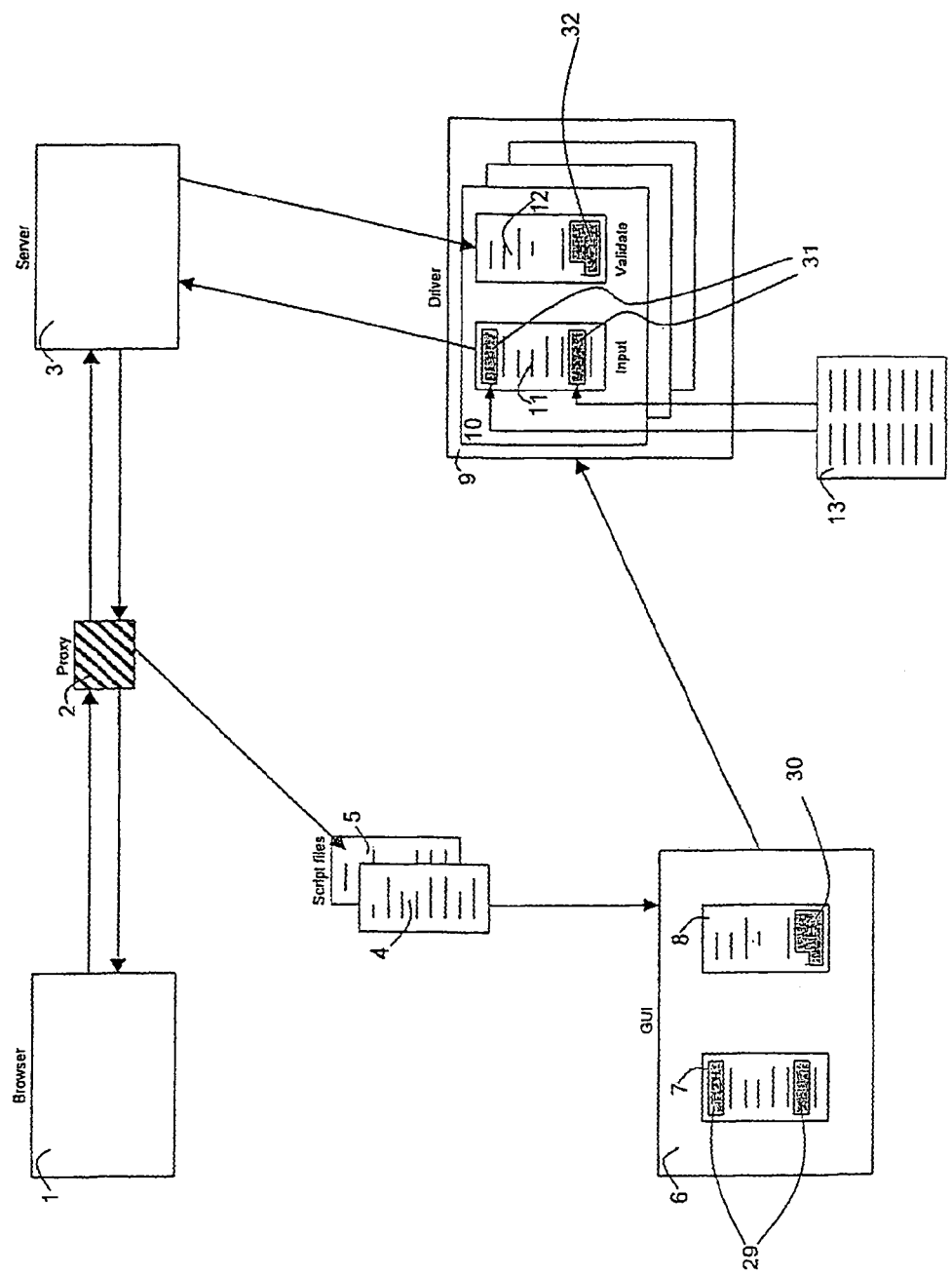
FIG. 1 illustrates the capture of data and how the data is used to later test the server.
Figure 2:
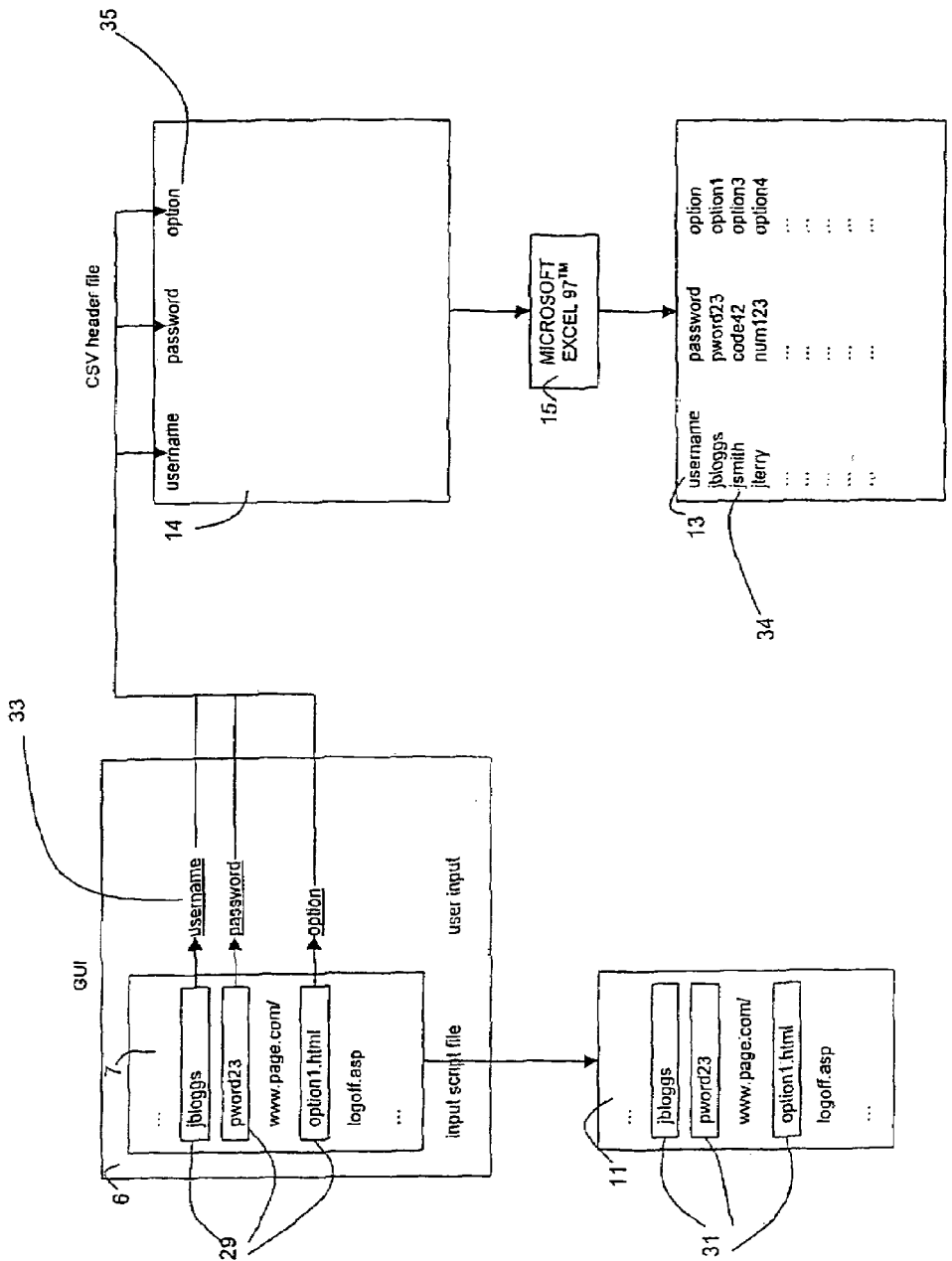
FIG. 2 illustrates how variable data is identified within the GUI and converted into a variable data file and a fabricated data file.

Referring to FIGS. 1 and 2, a user operates a browser 1 to interact with the web server 3. The data generated by the user's requests is captured by a proxy 2 and recorded in an input script file 4. The data generated by the web server's response is captured by the proxy into an output script file 5.

The user then utilises a Graphical User Interface (GUI) 6 to identify data 7 within the input script file that may change between user sessions (variable data), this data may include user names, user passwords, and URLs. The GUI assists the user in this process by searching the input script file for all occurrences of data identified by the user as variable data and marking this data as variable data. The result of the identification of variable data 29 is stored in a variable data file 11.

The user may also utilise the GUI 6 to identify data 8 within the output script file that can be used to validate the server's response. The result of the identification of validation data 30 is stored in validation data file 12.

The identification of variable data may be used to generate a Comma-Separated Variables (CSV) header file 14 with field headers 35 corresponding to the types of variable data identified 33. The CSV header file may be edited by the user using MICROSOFT EXCEL 97™ 15, or any other spreadsheet program, database program, etc., to fabricate different variable data 34. This file is stored as the fabricated data file 13.

A driver program 9 is provided which runs a thread 10 which uses the variable data file 11 to make requests of the server. Where the data within the variable data file is identified as variable data 31 the thread may select data from the fabricated data file 13. Data may be selected from the fabricated data file sequentially. Data returned by the server is verified by the thread using data identified as validation data 32 within the validation data file 12.

The driver program may run any number of threads each using different data in place of variable data and each independently verifying server responses.

The threads may run simultaneously or in succession, or some may run simultaneously and some may run in succession.

The driver program provides the ability to specify different options, including thread options, such as the number of threads, the number of simultaneous threads, time delays within thread execution to simulate actual user behaviour; environment options, such as identifying which variable data file or fabricated data file to use; and other options, such as specifying the overall duration of the test. An option may be provided to increase the number of simultaneous threads from zero to a specified number over the course of the test.

While the invention describes the server as a web server and the software used to interact with the server as a browser, it will appreciated by those skilled in the art that any server may be tested in this way and any program could be used in place of the browser.

Although the invention has been described with the user generating the fabricated data file from the CSV header file with a spreadsheet program it will be appreciated that any other method of generating the fabricated data file may be used, including computer generation. For example, a software module may generate the fabricated data file by creating random data, by extracting data from another database, or by selecting data from multiple lists and compiling them, randomly or in a defined pattern, into a composite.

Although the invention has been described with the data selected from the fabricated data file sequentially it will be appreciated that any other method of selecting the data may be used. For example, a deterministic random selection process or a hash function may be used.

Figure 3:
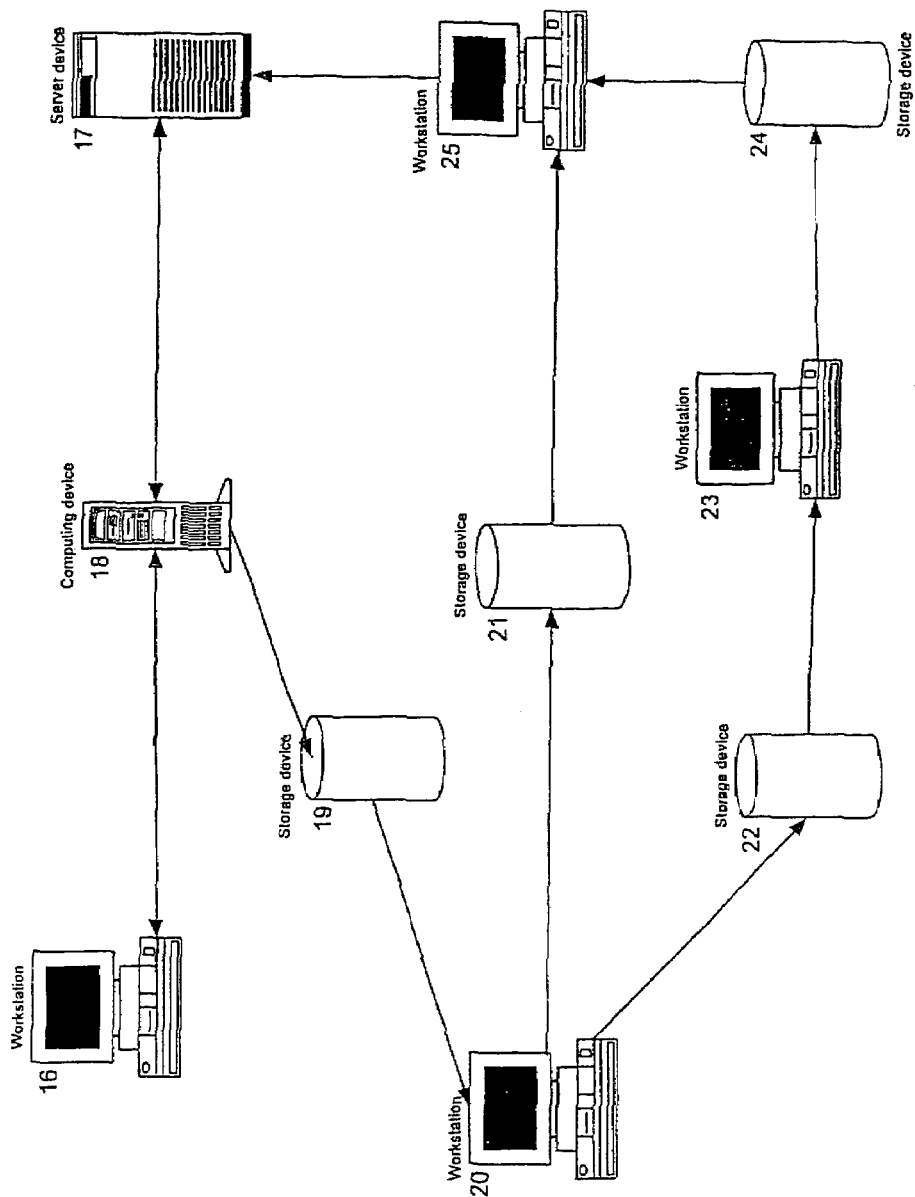
FIG. 3 illustrates how the method may be deployed on computer hardware.

FIG. 3 shows a possible server testing apparatus connected to a web server. The browser may be MICROSOFT INTERNET EXPLORER™ running under a MICROSOFT WINDOWS 2000™ environment on a workstation such as a IBM INTELLISTATION Z PRO™ 16. The web server may be running under a MICROSOFT NT™ environment on an IBM XSERIES 250 server device 17.

The proxy program may be running under a MICROSOFT WINDOWS 2000™ environment on a computing device such as an IBM INTELLISTATION Z PRO™ 18. The script files may be stored on a storage device such as an IBM XSERIES 200VL™ 19 file server.

The GUI may be running under a MICROSOFT WINDOWS 2000™ environment on a workstation such as an IBM INTELLISTATION Z PRO™ 20. The variable data file and the validation data file may be stored on a storage device such as an IBM XSERIES 200VL™ 21 file server.

The CSV header file may be stored on a storage device such as an IBM XSERIES 200VL™ 22 file server. The CSV header file may be edited by MICROSOFT EXCEL 97™ running under a MICROSOFT WINDOWS 2000™ environment on a workstation such as an IBM INTELLISTATION Z PRO™ 23. The fabricated data file may be stored on a storage device such as an IBM XSERIES 200VL™ 24 file server.

The driver program may be running under a MICROSOFT WINDOWS 2000™ environment on a workstation such as an IBM INTELLISTATION Z PRO™ 25.

The workstations, the server device, and the file servers may be connected to one another via a communications systems such as a Local Area Network (LAN) utilising coaxial cables.

Although this invention has been described with some of the script, variable data, validation data, CSV header and fabricated data files stored on separate file servers it will be appreciated that the files may be stored on a single file server or on internal hard disk drives or in any other storage arrangement.

FIG. 4 shows an implementation utilising a single PC connected to a server.

The browser, the proxy, the GUI, MICROSOFT EXCEL 97™, and the driver program may be running under a MICROSOFT WINDOWS 2000™ environment on a single workstation such as an IBM INTELLISTATION Z PRO™ 26. The workstation may be connected to the web server 27 via a communications system such as a Local Area Network (LAN) utilising coaxial cables. The script files, the variable data file, the validation data file, the CSV header file, and the fabricated data file may be stored on a hard disk drive such as an IBM DESKSTAR 120GXP™ 28 within the workstation.

Although this invention has been described with the method deployed on a number of workstations, file servers, and a server; and with the method deployed on a single workstation and a server; it will be appreciated that the method may be deployed in other arrangements. For example, the browser and proxy may be deployed on a single workstation and the GUI, MICROSOFT EXCEL 97™, and driver program may be deployed on a second single workstation.

Although this invention has been described by way of example it is to be appreciated that improvements and/or modifications may be made thereto without departing from the scope or spirit of the present invention.

The invention claimed is:

1. A method of testing a server, the method including the steps of:
    capturing script files resulting from the interaction between a server and another device;
    utilizing a Graphical User Interface (GUI) to identify variable data within the script files;
    creating substitute values for the identified variable data;
    forming a database of the created substitute values; and
    testing the server by using one or more separate threads each selecting data from the created substitute values in the database in substitution for the variable data.

2. A method as claimed in claim 1 wherein the other device is a user device.

3. A method as claimed in claim 1 wherein the server is a web server.

4. A method as claimed in claim 1 wherein the user interaction with the server occurs via a browser.

5. A method as claimed in claim 1 wherein a proxy is used to capture the interaction with the server.

6. A method as claimed in claim 1 wherein the variable data is user identification data.

7. A method as claimed in claim 1 wherein the variable data is product information data.

8. A method as claimed in claim 1 wherein the variable data is user option data.

9. A method as claimed in claims 1 wherein variable data is identified within the GUI by highlighting data.

10. A method as claimed in claim 1 wherein variable data is identified within the GUI by using a mouse device.

11. A method as claimed in claim 1 wherein the GUI assists identification by using pattern matching to automatically identify as variable data that data which is similar to data already identified as variable data by the user.

12. A method as claimed in any claim 1 wherein the GUI is used to identify data as validation data within the script files and the threads used to test the server use the identified validation data to verify server responses.

13. A method as claimed in claim 1 wherein the database is formed from a delimited file in turn generated from data identified in the GUI.

14. A method as claimed in claim 1 wherein the database is formed from a Comma-Separated Variables (CSV) header file in turn generated from data identified in the GUI.

15. A method as claimed in claim 13 wherein the database is populated using a database program.

16. A method as claimed in claim 13 wherein the database is populated using a spreadsheet program.

17. A method as claimed in claim 13 wherein the database is populated automatically.

18. A method as claimed in claim 1 further including setting thread options to specify the number of threads to execute when testing the server.

19. A method as claimed in claim 1 further including setting thread options to specify the number of treads to execute simultaneously.

20. A method as claimed in claim 19 wherein the number of threads executed simultaneously is increased from zero to the number specified.

21. A method as claimed in claim 1 further including setting thread options to specify delays affecting the execution of a thread.

22. A method as claimed in claim 1 further including setting environment options identifying which files to use as the variable data files and fabricated data files.

23. A method as claimed in any one of the preceding claims further including setting the duration of the test.

24. Apparatus programmed and configured to perform the method of claim 1 on a server.

25. A server testing apparatus including:
   means for capturing script files resulting from interaction between a server and another device;
   a Graphical User Interface (GUI) responsive to a user input device for identifying data within the script files;
   means for creating substitute values for the identified variable data;
   means for forming a database of the created substitute values; and means for generating one or more separate threads to test a server based upon the captured script files in which data from the created substitute values in the database is substituted for the variable data.

26. A server testing apparatus as claimed in claim 25 including a proxy device for capturing script files resulting from interaction between a server and another device.

27. A server testing apparatus as claimed in claim 25 wherein the user input device is a mouse device.

28. A server testing apparatus as claimed in claim 25 including a means for assisting the identification of variable data by using pattern matching to identify as variable data data similar to variable data identified by the user.

29. A server testing apparatus claimed in claim 25 including a means for populating a database.

30. A set of instructions and data coded signals which operate as software for effecting the method of claim 1 when executing on a computer system.

31. Storage media containing software as claimed in claim 30.

* * * * *